United States Patent
Min et al.

(10) Patent No.: US 8,810,585 B2
(45) Date of Patent: Aug. 19, 2014

(54) METHOD AND APPARATUS FOR PROCESSING VERTEX

(75) Inventors: Kyoung June Min, Yongin-si (KR); Seok Yoon Jung, Seoul (KR); Chan Min Park, Seoul (KR); Sung Jin Son, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 238 days.

(21) Appl. No.: 13/182,716

(22) Filed: Jul. 14, 2011

(65) Prior Publication Data

US 2012/0081370 A1 Apr. 5, 2012

(30) Foreign Application Priority Data

Oct. 1, 2010 (KR) .................. 10-2010-0095752

(51) Int. Cl.
*G06T 1/20* (2006.01)

(52) U.S. Cl.
USPC ............ 345/506; 345/419; 345/426; 345/502

(58) Field of Classification Search
USPC .......................................... 345/506
See application file for complete search history.

(56) References Cited

U.S. PATENT DOCUMENTS

| | | |
|---|---|---|
| 6,359,623 B1 | 3/2002 | Larson |
| 6,697,063 B1 | 2/2004 | Zhu |
| 6,924,801 B1 | 8/2005 | Dorbie |
| 6,943,797 B2 | 9/2005 | Wasserman et al. |
| 7,068,272 B1 | 6/2006 | Voorhies et al. |
| 7,741,247 B2 | 6/2010 | Wang |
| 2003/0043148 A1 | 3/2003 | Mei et al. |
| 2004/0212614 A1 | 10/2004 | Aila et al. |
| 2004/0222996 A1 | 11/2004 | Fraser |
| 2007/0171219 A1 | 7/2007 | Tsao |
| 2007/0279421 A1* | 12/2007 | Gruber et al. ................. 345/502 |
| 2008/0136816 A1 | 6/2008 | Morphet |
| 2008/0170079 A1* | 7/2008 | Ramshaw ..................... 345/501 |
| 2009/0046098 A1* | 2/2009 | Barone et al. ................. 345/420 |
| 2009/0256844 A1 | 10/2009 | Howson |
| 2010/0026684 A1 | 2/2010 | Hasselgren et al. |
| 2010/0302246 A1* | 12/2010 | Jiao et al. ...................... 345/426 |

FOREIGN PATENT DOCUMENTS

| | | |
|---|---|---|
| KR | 10-0793990 | 1/2008 |
| KR | 10-2008-0069924 | 7/2008 |

* cited by examiner

*Primary Examiner* — Ke Xiao
*Assistant Examiner* — F. M. Hossain
(74) *Attorney, Agent, or Firm* — Staas & Halsey LLP

(57) ABSTRACT

A method and apparatus for processing a vertex may fetch pieces of position information of vertexes, may extract pieces of target position information from the fetched pieces of position information, may perform tile binning on the pieces of target position information, may fetch pieces of attribute information having same indexes as the pieces of target position information, and may shade the fetched pieces of attribute information.

20 Claims, 9 Drawing Sheets

Trivially Rejected Triangles : △

Clipped Triangles : △

Trivially Accepted Triangles : △

• : P

Viewport

METHOD AND APPARATUS FOR PROCESSING VERTEX

CROSS-REFERENCE TO RELATED APPLICATIONS

This application claims the benefit of Korean Patent Application No. 10-2010-0095752, filed on Oct. 1, 2010, in the Korean Intellectual Property Office, the disclosure of which is incorporated herein by reference.

BACKGROUND

1. Field

Example embodiments of the following description relate to a method and apparatus for processing a vertex, and more particularly, to a method and apparatus for processing a vertex that may selectively fetch attribute information of the vertex and shade the fetched attribute information.

2. Description of the Related Art

A tile-based rendering (TBR) architecture among technologies for realizing three-dimensional (3D) graphics enables 3D visualization in various fields ranging from mobile devices to precise scientific simulations. The TBR architecture may perform fragment processing in a tile buffer that is an on-chip memory of a graphics pipeline, and may transmit a final result to an off-chip memory of the graphics pipeline. Accordingly, a scene buffer for storing a result of the TBR and a result of a tile binning operation is additionally required. Here, to increase realism of 3D graphics, when a number of used vertexes is increased, a bandwidth of an off-chip memory that is required to fetch initial vertex data, and a requirement for a bandwidth of an off-chip memory connected to the scene buffer may be rapidly increased. In other words, costs incurred by accessing the off-chip memory and overhead costs incurred by the tile binning operation may be increased. Accordingly, there is a desire to improve a data processing performance by reducing an induction of a memory bandwidth caused by the TBR architecture.

SUMMARY

The foregoing and/or other aspects are achieved by providing a vertex processing method of a graphics pipeline for tile-based rendering (TBR), the vertex processing method including fetching pieces of position information of vertexes, outputting pieces of target position information pertaining to primitives displayed on a viewport among the fetched pieces of position information, performing tile binning on the output pieces of target position information, and outputting a result of the tile binning, and fetching pieces of attribute information of vertexes corresponding to the pieces of target position information among the vertexes, and shading the fetched pieces of attribute information.

The performing of the tile binning and the fetching and shading of the pieces of attribute information may be processed in parallel.

The result of the tile binning and the shaded pieces of attribute information may be simultaneously stored in an off-chip memory connected via a bus to a processor that processes an operation of the graphics pipeline.

The fetching of the pieces of position information may include storing indexes of the vertexes in a vertex index buffer, caching the pieces of position information and the pieces of attribute information in a vertex cache, and fetching, from the vertex cache, pieces of position information corresponding to the indexes inputted from the vertex index buffer.

The pieces of attribute information may include normal vector information of the vertexes, color information of the vertexes, and texture coordinate information of the vertexes.

The pieces of target position information may be obtained by excluding pieces of non-target position information pertaining to a primitive not displayed on a screen, from the fetched pieces of position information.

The outputting of the pieces of target position information may include removing the pieces of non-target position information using at least one of a back face culling process, a trivial accept and reject test process used to remove a vertex outside the viewport, and a zero-area triangle removal process used to remove a vertex displayed as a point having a size less than a pixel size.

The vertex processing method may further include shading the fetched pieces of position information and performing a transformation on a position, and mapping the output pieces of target position information to the viewport.

The foregoing and/or other aspects are achieved by providing a vertex processing apparatus for TBR, the vertex processing apparatus including a fetching unit to selectively fetch pieces of position information of vertexes and pieces of attribute information of the vertexes, a first shader to transform the pieces of position information fetched by the fetching unit to a coordinate system on a viewport, a primitive assembly unit to output pieces of target position information pertaining to primitives displayed on the viewport, among the pieces of position information fetched by the fetching unit, a tile binning unit to perform tile binning on the output pieces of target position information, and to output a result of the tile binning, and a second shader to shade pieces of attribute information of vertexes corresponding to the pieces of target position information among the vertexes, when the pieces of attribute information are fetched by the fetching unit.

The performing of the tile binning and the shading of the pieces of attribute information may be processed in parallel.

The fetching unit may include a vertex index buffer to store indexes of the vertexes, a vertex cache to cache the pieces of position information and the pieces of attribute information, and a vertex data fetching unit to fetch, from the vertex cache, pieces of position information corresponding to the indexes inputted from the vertex index buffer, and to fetch, from the vertex cache, pieces of attribute information corresponding to a same index as the pieces of target position information.

The primitive assembly unit may output, as the pieces of target position information, pieces of position information obtained by excluding pieces of non-target position information pertaining to a primitive not displayed on a screen, from the fetched pieces of position information.

The vertex processing apparatus may further include a viewport mapping unit to map the output pieces of target position information to the viewport, and a multiplexer to provide the first shader with the pieces of position information and to provide the second shader with the pieces of attribute information, the pieces of position information and the pieces of attribute information being selectively fetched by the fetching unit.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
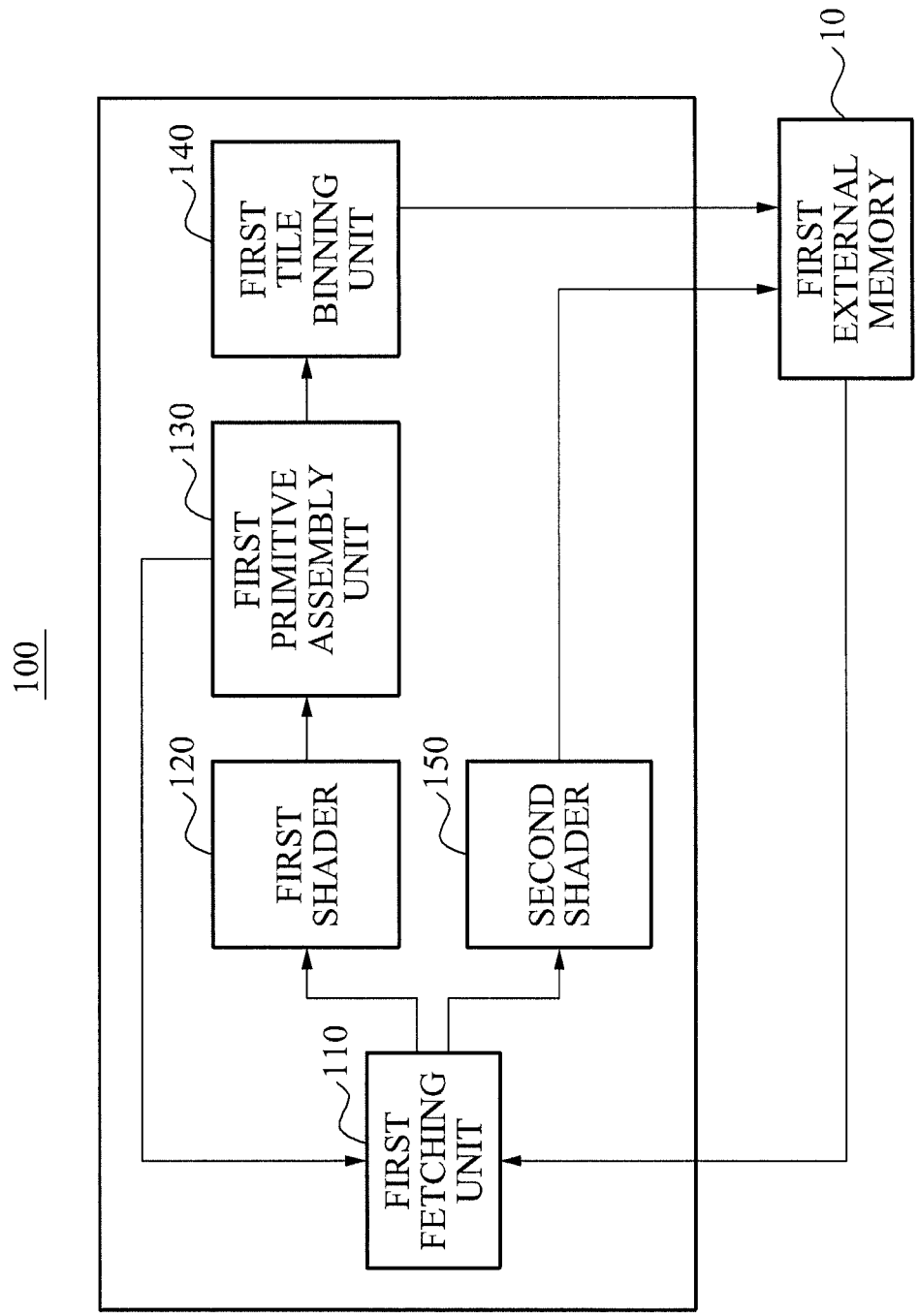
FIG. 1 illustrates a block diagram of a vertex processing apparatus for tile-based rendering (TBR) according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of a vertex processing apparatus 100 for tile-based rendering (TBR) according to example embodiments.

Figure 2:
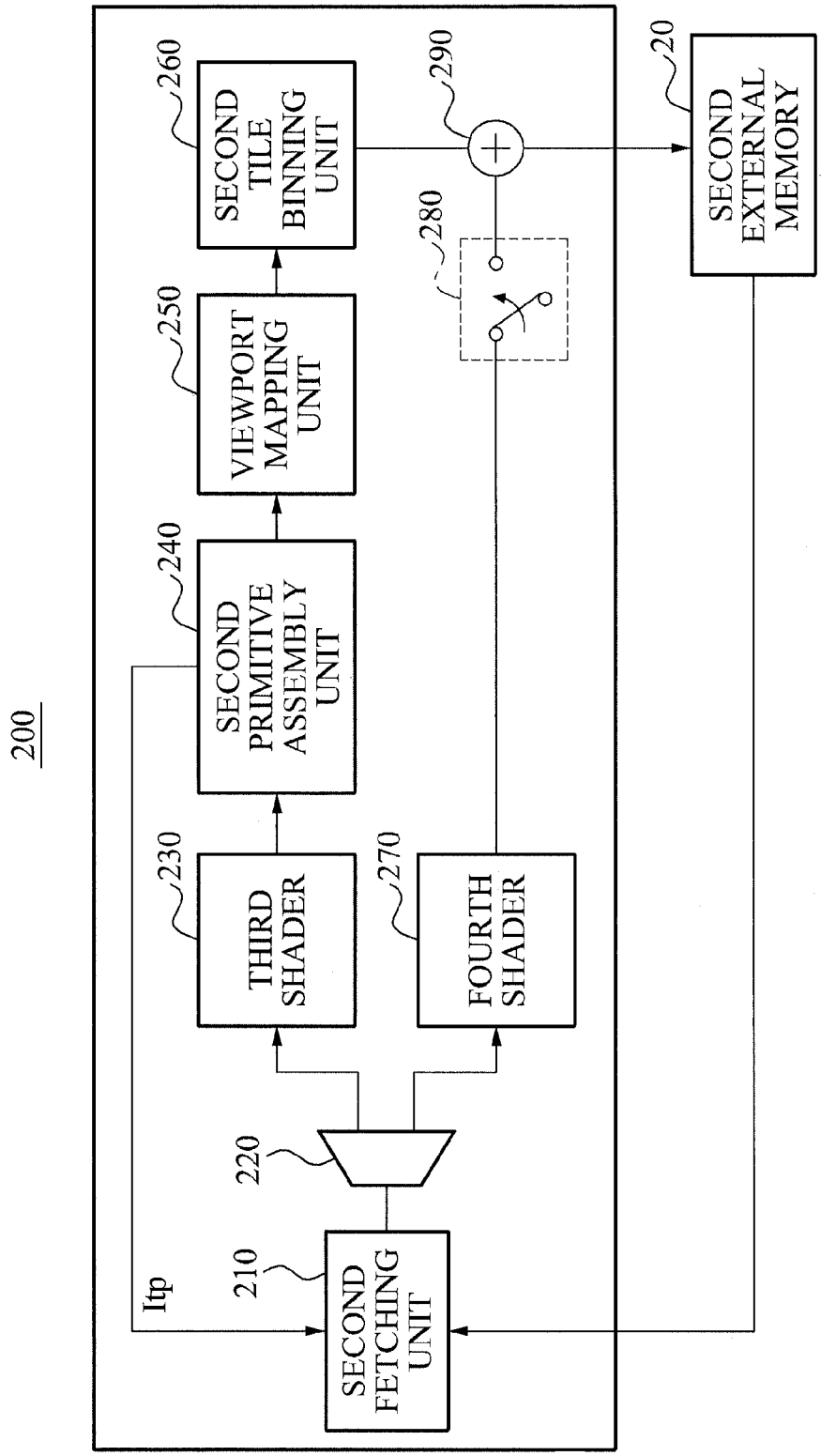
FIG. 2 illustrates a block diagram of a vertex processing apparatus for TBR according to another of the example embodiments.

FIG. 2 illustrates a block diagram of a vertex processing apparatus 200 for tile-based rendering (TBR) according to another of the example embodiments.

First, the vertex processing apparatus 100 of FIG. 1, and the vertex processing apparatus 200 that will be described below may perform vertex processing and geometry processing based on a graphics pipeline for TBR. Referring to FIG. 1, the vertex processing apparatus 100 may include a first fetching unit 110, a first shader 120, a first primitive assembly unit 130, a first tile binning unit 140, and a second shader 150.

The first fetching unit 110 may fetch vertex data to be currently processed among vertex data stored in a first external memory 10. The first external memory 10 may be an off-chip memory connected via a bus to the vertex processing apparatus 100. The vertex data may include position information of each vertex, and attribute information of each vertex.

The first shader 120 may shade pieces of position information of vertexes fetched by the first fetching unit 110, and may perform a transformation on a position to a coordinate system on a viewport. Accordingly, the first shader 120 may calculate an angle and a direction that a viewer sees the vertexes, and the like.

The first primitive assembly unit 130 may output pieces of target position information pertaining to a primitive displayed on the viewport, among the pieces of position information fetched by the first fetching unit 110.

The first tile binning unit 140 may perform tile binning on the pieces of target position information output from the first primitive assembly unit 130, and may output a result of the tile binning. The result of the tile binning may be updated in the first external memory 10.

When pieces of attribute information of vertexes corresponding to the pieces of target position information output from the first primitive assembly unit 130 is fetched by the first fetching unit 110, the second shader 150 may shade the fetched pieces of attribute information. For example, the second shader 150 may perform a normal vector transformation, a color transformation, a texture coordinate transformation, and the like.

FIG. 2 illustrates a block diagram of the vertex processing apparatus 200 for TBR according to example embodiments.

Referring to FIG. 2, the vertex processing apparatus 200 may include a second fetching unit 210, a multiplexer 220, a third shader 230, a second primitive assembly unit 240, a viewport mapping unit 250, a second tile binning unit 260, a fourth shader 270, a switching unit 280, and an adding unit 290.

The second fetching unit 210 may fetch vertex data to be currently processed among vertex data stored in a second external memory 20. The second external memory 20 may be an off-chip memory connected via a bus to the vertex processing apparatus 200. The fetched vertex data may include position information of each vertex, and attribute information of each vertex. Here, the second fetching unit 210 may selectively fetch the position information and attribute information, instead of fetching the position information together with the attribute information. Additionally, the second fetching unit 210 may fetch all pieces of position information of vertexes, and fetch only a portion of pieces of position information of vertexes.

Position information of vertexes may be substantially included in attribute information of vertexes. However, hereinafter, position information and attribute information will be individually described for convenience of description. Attribute information of vertexes may include, for example, at least one of normal vector information 'n', color information 'c', and texture coordinate information 't', with respect to vertexes. The attribute information may be required to process vertexes, and there is no limitation to the above examples.

Figure 3:
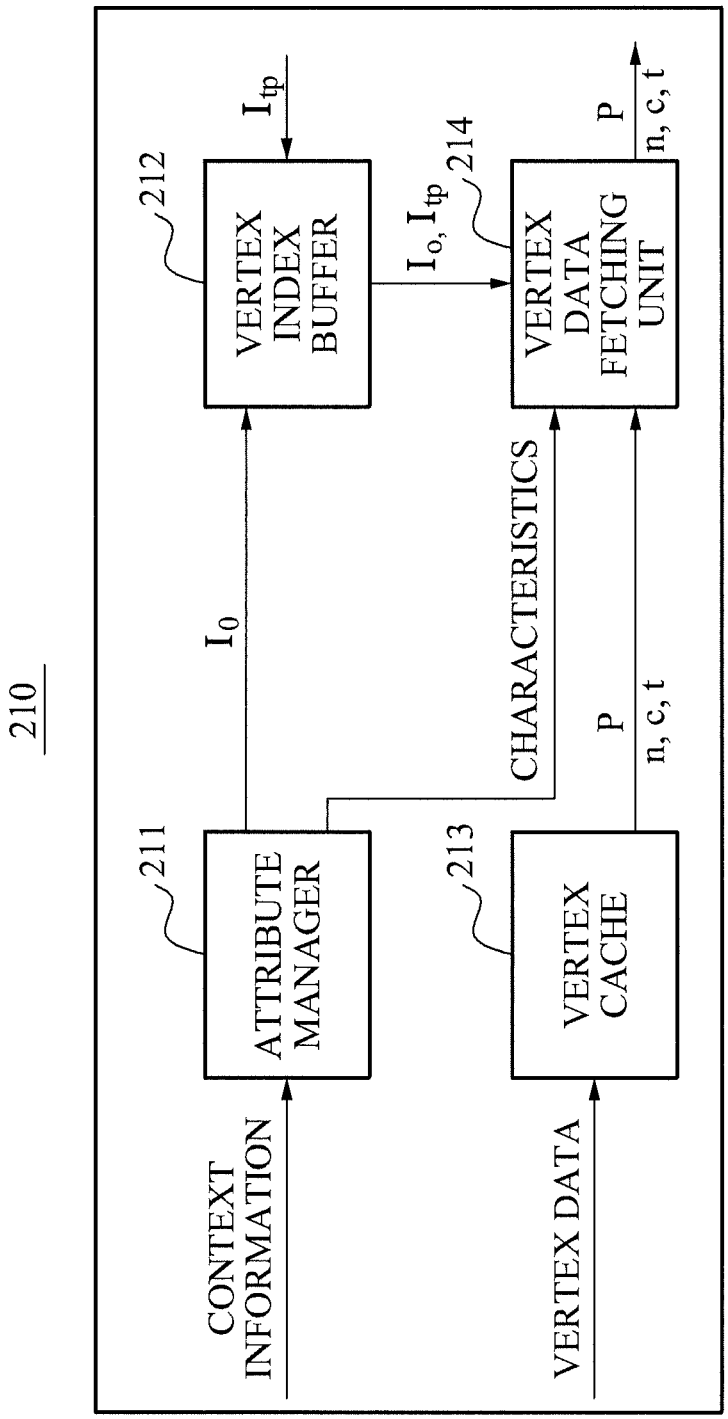
FIG. 3 illustrates a block diagram of a second fetching unit of FIG. 2.

FIG. 3 illustrates a block diagram of the second fetching unit 210 of FIG. 2.

Referring to FIG. 3, the second fetching unit 210 may include an attribute manager 211, a vertex index buffer 212, a vertex cache 213, and a vertex data fetching unit 214.

The attribute manager 211 may set and manage characteristics of position information and attribute information that are to be fetched, using input pieces of rendering context information. The characteristics of the position information and attribute information may be used to more accurately fetch the position information and attribute information from the vertex cache 213 by the vertex data fetching unit 214.

The characteristics of the position information and attribute information may include information regarding a dimension, a data type, a stride indicating a length of a vertex record shown in bytes, a source address, constant attribute values, and the like. Table 1 shows examples of the data type and dimension.

[TABLE 1]

|  | Data type | Dimension |
|---|---|---|
| Characteristics | Position | 3D or 4D |
|  | Normal vector | 3D |

[TABLE 1]-continued

| Data type | Dimension |
| --- | --- |
| Color | 4D |
| Texture coordinate | 2D |

Rendering context may include the above-described characteristics of the position information and attribute information, and may have a data structure with all parameter values used to describe a single scene. For example, the rendering context may include parameter values associated with a 3D library, such as an open graphics library (OpenGL).

The attribute manager 211 may provide the vertex index buffer 212 with original indexes $I_o$, and may provide the vertex data fetching unit 214 with characteristics of the position information and attribute information. Each of the original index $I_o$ may refer to an index assigned to each vertex. The attribute manager 211 may simultaneously provide the vertex index buffer 212 with a plurality of indexes assigned to a plurality of vertexes. For example, the attribute manager 211 may provide indexes of vertexes for each of n polygons. When a polygon is a triangle, the attribute manager 211 may provide 3n indexes of vertexes to the vertex data fetching unit 214.

The vertex index buffer 212 may store the original indexes $I_o$ of vertexes received from the attribute manager 211. The vertex index buffer 212 may sequentially output the stored original indexes $I_o$ to the vertex data fetching unit 214, based on an index. Additionally, the vertex index buffer 212 may store indexes $I_{tp}$ received from the second primitive assembly unit 240 that will be described below, and may sequentially output the stored indexes $I_{tp}$ to the vertex data fetching unit 214. A number of indexes $I_{tp}$ may be equal to or less than a number of original indexes $I_o$.

The vertex cache 213 may cache vertex data of vertexes from the second external memory 20, and may store the cached vertex data. The cached vertex data may include position information P and attribute information n, c, and t of each vertex.

Additionally, the vertex cache 213 may be, for example, a read-only vertex cache, and may be implemented, for example, by N direct-mapped caches or an N-way set associative cache, based on a maximum value N of a total number of pieces of attribute information and pieces of position information. Here, direct-mapped caches or N-way set associative caches are well-known and accordingly, further descriptions thereof will be omitted.

The vertex data fetching unit 214 may fetch, from the vertex cache 213, the position information P corresponding to the original index $I_o$ received from the vertex index buffer 212, and may provide the multiplexer 220 with the fetched position information P. Additionally, the vertex data fetching unit 214 may fetch, from the vertex cache 213, attribute information n, c, t corresponding to a same index as target position information that will be described below, and may provide the multiplexer 220 with the fetched attribute information n, c, t.

In particular, to more accurately perform fetching, the vertex data fetching unit 214 may calculate an address value of an address where vertex data is stored, using the input index $I_o$ or $I_{tp}$, and may fetch vertex data corresponding to the calculated address value from the vertex cache 213. The vertex data fetching unit 214 may more precisely calculate the address value, using characteristics of the position information p and attribute information n, c, t that are provided by the attribute manager 211.

Referring back to FIG. 2, the multiplexer 220 may provide the position information and the attribute information that are selectively fetched by the second fetching unit 210 or the vertex data fetching unit 214 to the third shader 230 and the fourth shader 270, respectively. Specifically, when the position information is received from the vertex data fetching unit 214, the multiplexer 220 may perform multiplexing, so that the position information may be provided to the third shader 230. Additionally, when the attribute information is received, the multiplexer 220 may perform multiplexing, so that the attribute information may be provided to the fourth shader 270.

The third shader 230 may shade position information of vertexes fetched by the second fetching unit 210, and may perform a transformation on a position to a coordinate system on a viewport. For example, the third shader 230 may transform the position information to a world coordinate system, a view coordinate system, a projection coordinate system, and the like, and may determine positions of vertexes based on a viewpoint. Accordingly, the third shader 230 may calculate an angle and a direction that a viewer sees vertexes or a primitive, and the like.

In a 3D graphics field, all objects may be represented using primitives, such as points, lines, polygons, and the like. As a result, the primitives may be represented as at least one vertex. Additionally, a world coordinate system, a view coordinate system, and a projection coordinate system are well-known in the 3D graphics field and accordingly, further descriptions thereof will be omitted for convenience of description.

The second primitive assembly unit 240 may output pieces of target position information pertaining to primitives displayed on a viewport, among pieces of position information of vertexes fetched by the second fetching unit 210. Specifically, the second primitive assembly unit 240 may determine, as pieces of target position information, pieces of position information obtained by excluding pieces of non-target position information outside the viewport from the fetched pieces of position information. The second primitive assembly unit 240 may update an index list of the pieces of target position information, and may output the updated index list. The pieces of non-target position information may pertain to a primitive that is not displayed on a screen or a viewport.

When a triangle is used as a processing unit of the second primitive assembly unit 240, the second primitive assembly unit 240 may output pieces of target position information, after pieces of position information of three vertexes of a single triangle are input. Here, a number of the pieces of target position information may be less than three.

The second primitive assembly unit 240 may remove pieces of non-target position information, using at least one of a back face culling process, a trivial accept and rejection test process, and a zero-area triangle removal process. The trivial accept and rejection test process may be used to remove vertexes or a triangle outside a viewport, and the zero-area triangle removal process may be used to remove vertexes or a triangle displayed as a point having a size less than a pixel size.

Figure 4A:
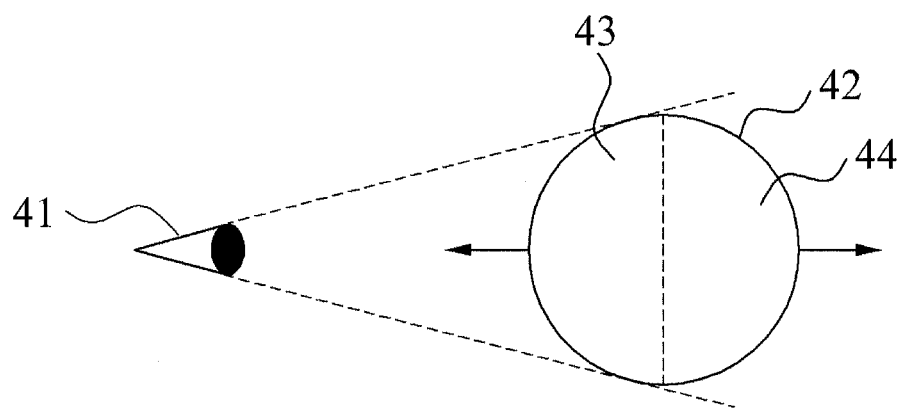
FIGS. 4A and 4B illustrate diagrams of examples of a back face culling process according to example embodiments.
Figure 4B:
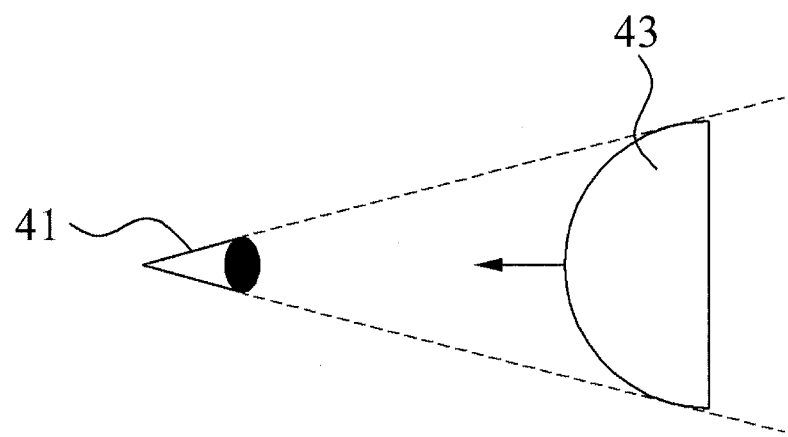

FIGS. 4A and 4B illustrate examples of the back face culling process.

Referring to FIG. 4A, a viewer 41 views a sphere 42 including vertexes. Here, a front face 43 of the sphere 42 is shown to the viewer 41, and a back face 44 is not shown to the viewer 41. In other words, the viewer 41 may view different faces of the sphere 42, depending on a projection position or a projection direction. The back face culling process may be used to remove geometric information corresponding to the back face 44 when an object, namely, the sphere 42 is opaque, as illustrated in FIG. 4B.

Figure 5:
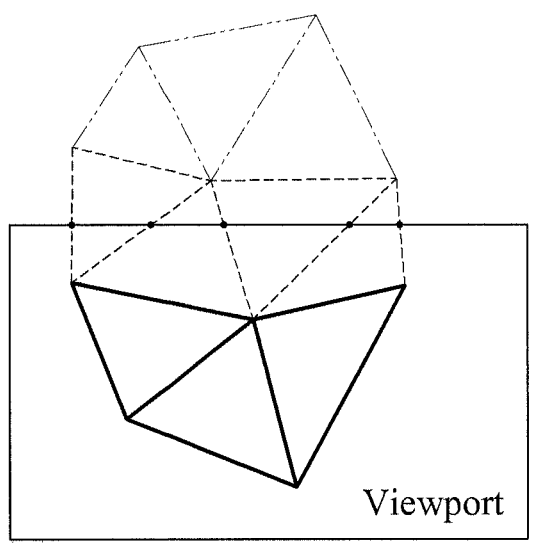
FIG. 5 illustrates a diagram of an example of a trivial accept and reject test process according to example embodiments.

FIG. 5 illustrates an example of the trivial accept and reject test process.

Referring to FIG. 5, triangles may be classified, based on an edge of a viewport, into three types, for example, into a trivially accepted triangle, a clipped triangle, and a trivially rejected triangle. In FIG. 5, a trivially accepted triangle indicated by a solid line may refer to a triangle located within a viewport, and a clipped triangle indicated by a dotted line may refer to a triangle of which a portion is within the viewport and the other portion is outside the viewport. Additionally, a trivially rejected triangle indicated by a dash dotted line may refer to a triangle located outside the viewport.

The trivial accept and reject test process may be used to remove a triangle corresponding to the trivially rejected triangle type among the three types, to remove a portion of a clipped triangle that is outside the viewport, and to form a new triangle using points P of edges of the viewport.

The zero-area triangle removal process may be used to remove triangles that may become lines or points having a size less than a pixel size based on a position of a viewer and projection direction.

The second primitive assembly unit 240 may reduce a number of pieces of target position information to be processed by the viewport mapping unit 250, using the above-described processs. Additionally, the second primitive assembly unit 240 may provide the vertex index buffer 212 with an index $I_{tp}$ of target position information obtained by removing pieces of position information that are not displayed on the viewport. Accordingly, the original index $I_o$ of the same vertex may be substantially identical to the index $I_{tp}$ received from the second primitive assembly unit 240, and the original index $I_o$ and the index $I_{tp}$ will be differently indicated for convenience of description.

Referring back to FIG. 2, the viewport mapping unit 250 may map, to the viewport, the pieces of target position information received from the second primitive assembly unit 240. Since the pieces of target position information have 3D coordinates, the viewport mapping unit 250 may transform the 3D coordinates of the pieces of target position information into 2D coordinates, and may map the pieces of target position information to the viewport.

The second tile binning unit 260 may perform tile binning on the pieces of target position information received from the viewport mapping unit 250, and may output a result of the tile binning to the adding unit 290. Here, the tile binning may include classifying viewports for each tile, and verifying tiles pertaining to a triangle when a primitive is a triangle. Additionally, the tile binning may include storing, in a scene buffer, information of tiles pertaining to a triangle, and vertex data of the triangle. The scene buffer may be included in the second external memory 20, or may be implemented as a separate off-chip memory.

The vertex index buffer 212 of the second fetching unit 210 may provide the vertex data fetching unit 214 with the index list received from the second primitive assembly unit 240. The index list may include the updated indexes of the pieces of target position information.

The vertex data fetching unit 214 may fetch, from the second external memory 20, attribute information having the same index $I_{tp}$ as the target position information, and may provide the multiplexer 220 with the fetched attribute information.

The multiplexer 220 may multiplex the attribute information received from the vertex data fetching unit 214, and may provide the multiplexed attribute information to the fourth shader 270.

When the attribute information is received from the multiplexer 220, the fourth shader 270 may shade the received attribute information. For example, the fourth shader 270 may perform a normal vector transformation, a color transformation, a texture coordinate transformation, and the like. The fourth shader 270 may output the shaded attribute information to the switching unit 280.

The switching unit 280 may provide a data transmission path between the adding unit 290 and the fourth shader 270. When the attribute information shaded by the fourth shader 270 exists, the switching unit 280 may be switched on, and the fourth shader 270 may be connected to the adding unit 290, so that the shaded attribute information may be provided to the adding unit 290. Conversely, when the attribute information shaded by the fourth shader 270 does not exist, the switching unit 280 may be switched off, and may terminate a connection between the fourth shader 270 and the adding unit 290.

The adding unit 290 may add the result of the tile binning received from the second tile binning unit 260 to the shaded attribute information received via the switching unit 280, and may provide a result obtained by the adding to the second external memory 20. Specifically, the adding unit 290 may combine a result of transforming pieces of target position information of vertexes having the same index, with a result of vertex shading of attribute information, and may provide the combined results to the second external memory 20. Alternatively, when both tile binning of vertexes pertaining to a single scene, and shading of attribute information are completed, the adding unit 290 may provide the second external memory 20 with a result of the completed tile binning and the shaded attribute information, for each scene.

Figure 6:
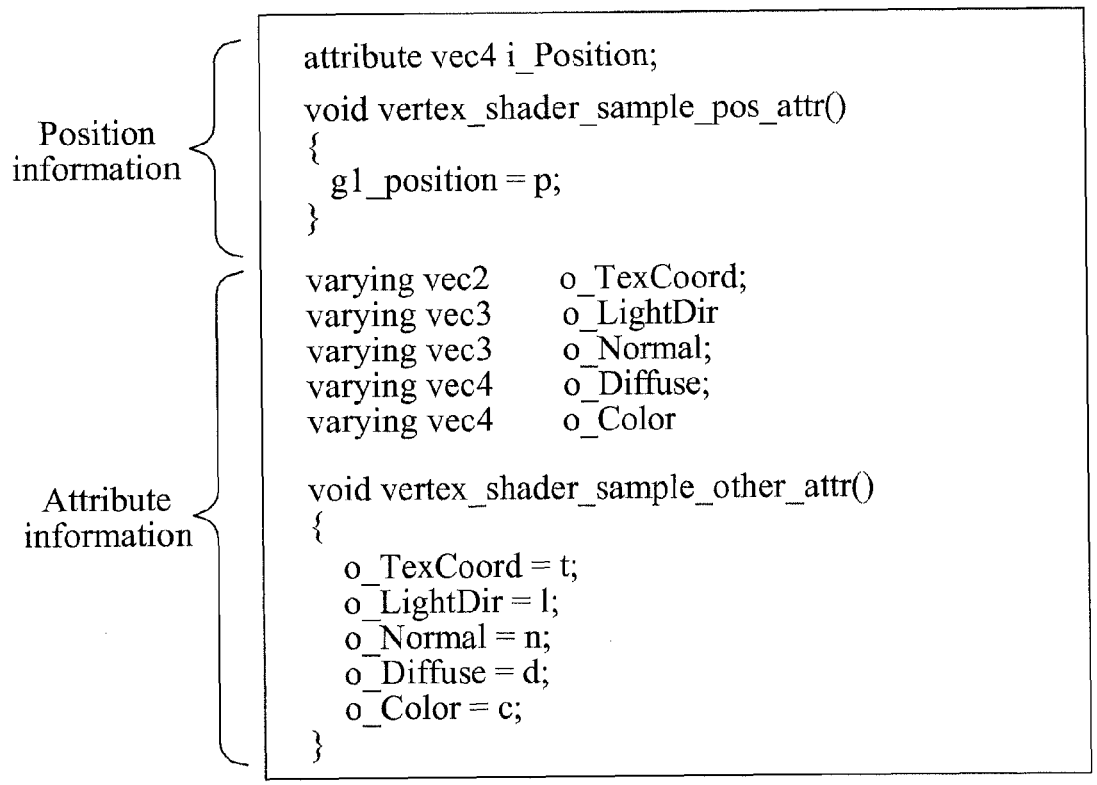
FIG. 6 illustrates a diagram of an example of a programming process for independently shading target position information and attribute information according to example embodiments.

The third shader 230 and the fourth shader 270 may perform the above operations through a single vertex shader or each vertex shader. A vertex shader may enable real-time processing of data using a program, to provide a 3D image. The third shader 230 and the fourth shader 270 may independently shade position information and attribute information, respectively, using an independent vertex shader compiler directive programming process, as illustrated in FIG. 6.

Figure 7:
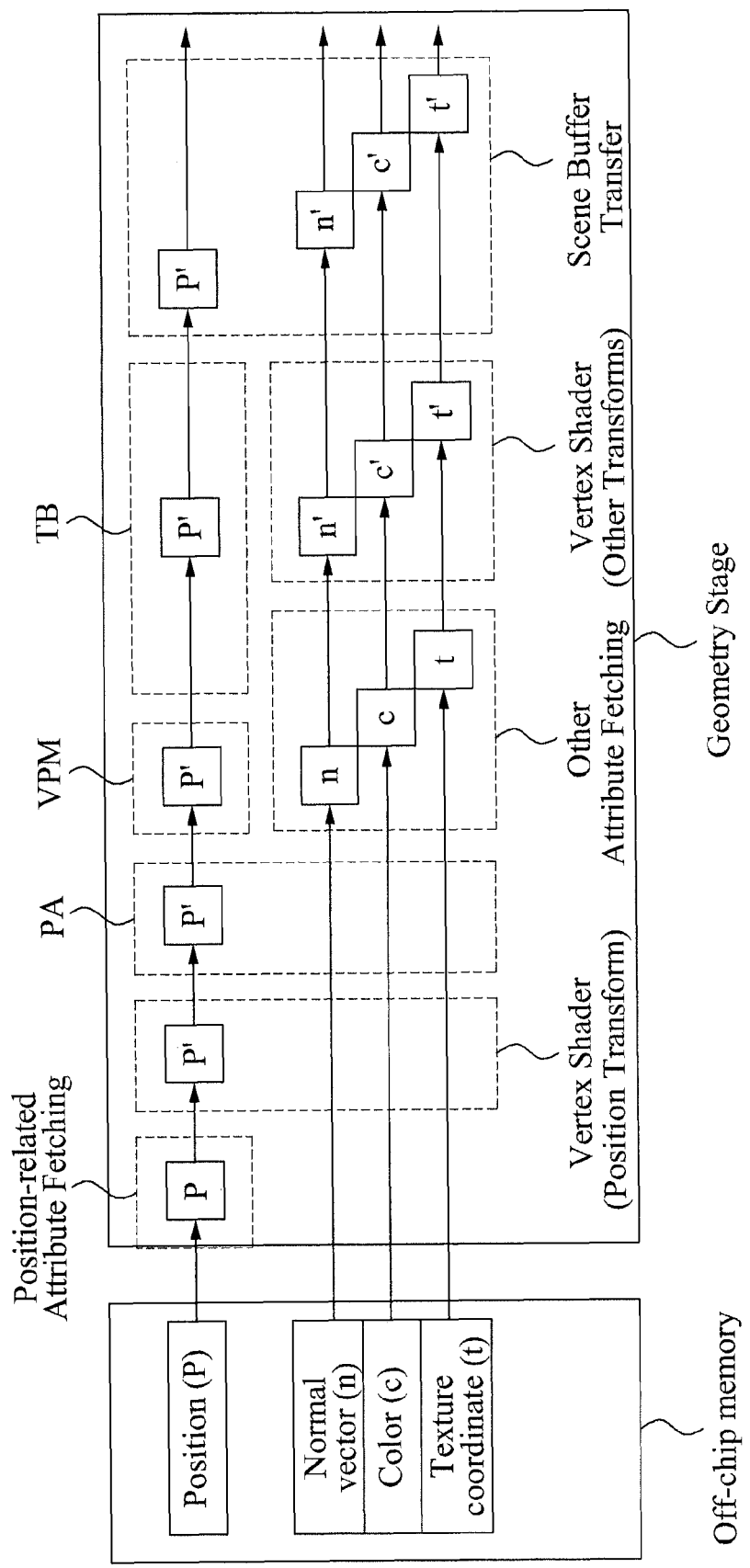
FIG. 7 illustrates a diagram of an operation of selectively fetching and processing position information and attribute information by a three-dimensional (3D) graphics pipeline of the vertex processing apparatus of FIG. 2.

FIG. 7 illustrates a diagram of an operation of selectively fetching and processing position information and attribute information by a 3D graphics pipeline of the vertex processing apparatus 200.

Referring to FIGS. 2 and 7, an off-chip memory of FIG. 7 may function as the second external memory 20 of FIG. 2, and position information P and attribute information n, c, t of vertexes may be stored for each scene. First, the second fetching unit 210 may fetch pieces of position information of vertexes. The third shader 230 may shade the fetched pieces of position information, and may perform a transformation on a position.

The second primitive assembly unit 240 may be operated in polygon units. Accordingly, the second primitive assembly unit 240 may remove unnecessary position information from pieces of position information forming a polygon, by culling or clipping, and may extract target position information. Thus, a number of pieces of position information of the polygon may be reduced, and a number of indexes may also be reduced.

The viewport mapping unit 250 may map target position information to the viewport, and the second tile binning unit 260 may perform tile binning on the target position information mapped to the viewport. Here, the second fetching unit 210 may fetch, from the off-chip memory, attribute information having a same index as target position information, and the fourth shader 270 may shade the fetched attribute information. In other words, an operation of processing the target position information in the viewport mapping unit 250 and second tile binning unit 260 may be performed in parallel with an operation of fetching and shading the attribute information. A result of the tile binning output from the second tile binning unit 260, and the shaded attribute information output from the fourth shader 270 may be provided to a scene buffer, namely, the off-chip memory.

The vertex processing apparatus 100 and the vertex processing apparatus 200 may not fetch pieces of position information together with pieces of attribute information of vertexes. Specifically, the vertex processing apparatus 100 and the vertex processing apparatus 200 may fetch pieces of position information, may remove unnecessary pieces of position information, and may then fetch pieces of attribute information corresponding to pieces of position information obtained by removing the unnecessary pieces of position information. Accordingly, an amount of fetched attribute information may be reduced and thus, a bandwidth resource for memory access may also be reduced.

Figure 8:
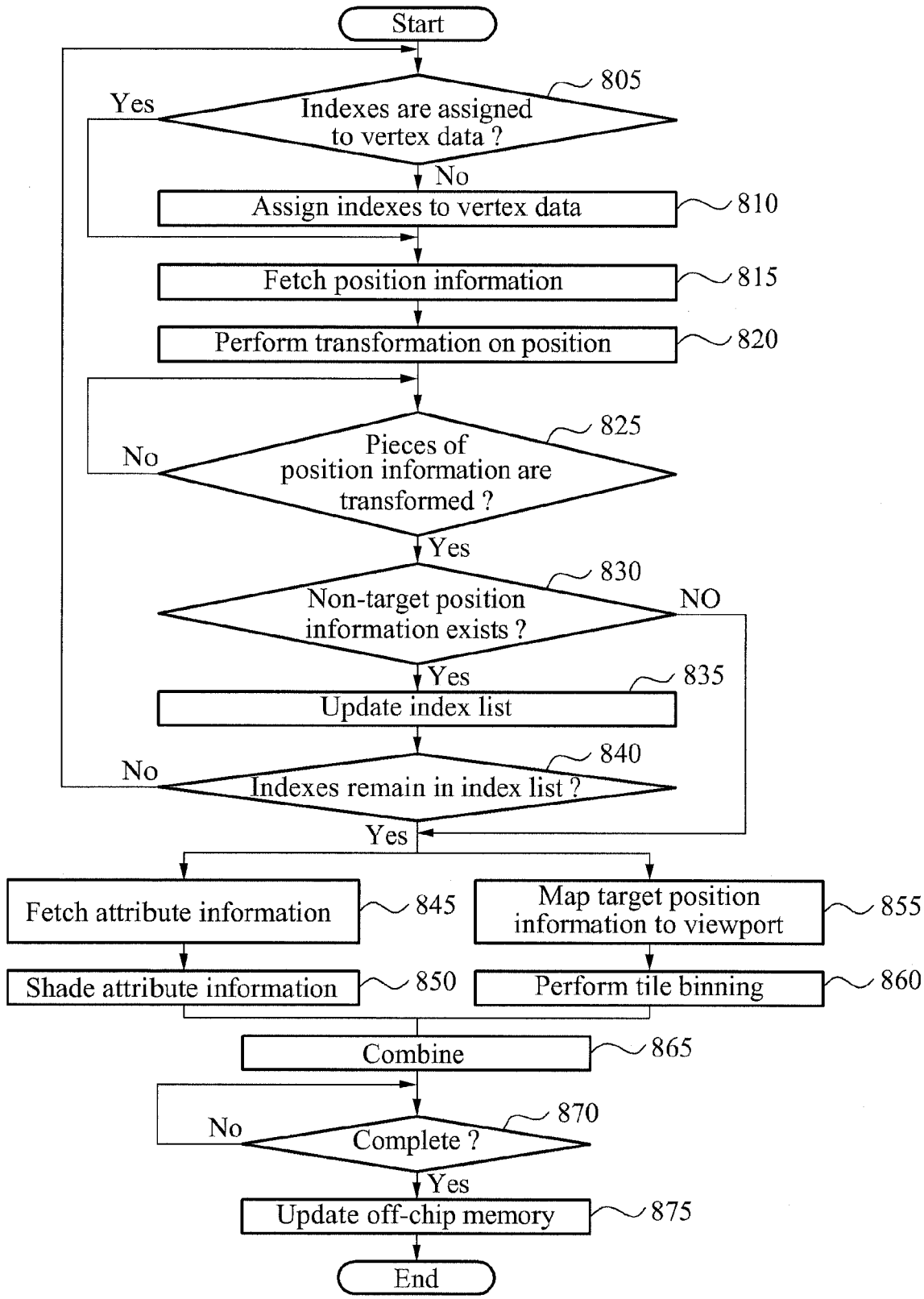
FIG. 8 illustrates a flowchart of a vertex processing method of a graphics pipeline for TBR according to example embodiments.

FIG. 8 illustrates a flowchart of a vertex processing method of a graphics pipeline for TBR according to example embodiments.

The vertex processing method of FIG. 8 may be performed by a vertex processing apparatus, for example, the vertex processing apparatus 200 of FIG. 2, or a processor (not illustrated) of the vertex processing apparatus 200. Here, the processor may process an operation of the graphics pipeline.

In operation 805, the vertex processing apparatus may cache, in a vertex cache, pieces of vertex data stored in an off-chip memory, and may determine whether indexes are assigned to the pieces of vertex data. When it is determined that the indexes are not assigned to the pieces of vertex data, the vertex processing apparatus may assign different indexes to the pieces of vertex data. Alternatively, when a vertex index is not included, the vertex processing apparatus may assign indexes to the pieces of vertex data stored in the off-chip memory. Assignment of indexes may be performed by assigning constants ranging from 0 to n to pieces of data in an input sequence, since the pieces of data are sequentially input to the off-chip memory.

In operation 815, the vertex processing apparatus may fetch pieces of position information of vertexes. Here, the pieces of position information of vertexes may be stored in the vertex cash or the off-chip memory.

In operation 820, the vertex processing apparatus may shade the fetched pieces of position information, and may perform a transformation on a position.

In operation 825, the vertex processing apparatus may wait until a transformation of pieces of position information using a processing unit such as a polygon is completed. For example, when a triangle is used as a processing unit, the vertex processing apparatus may wait until a transformation of at least three pieces of position information is performed.

In operation 830, the vertex processing apparatus may determine whether non-target position information exists among pieces of position information pertaining to a polygon. Specifically, the vertex processing apparatus may output pieces of target position information pertaining to primitives displayed on a viewport, among the fetched pieces of position information.

Here, operations 805 through 830 may be repeatedly processed using a bunch of a plurality of primitives for efficiency.

In operation 835, the vertex processing apparatus may update an index list of pieces of position information that are obtained by excluding pieces of non-target position information that are located outside the viewport, and may output the updated index list, in order to output the remaining pieces of position information as pieces of target position information. Here, the vertex processing apparatus may remove the pieces of non-target position information, using at least one of a back face culling process, a trivial accept and reject test process, and a zero-area triangle removal process.

In operation 840, the vertex processing apparatus may determine whether indexes remain in the updated index list.

When the indexes are determined to remain in the index list, the vertex processing apparatus may fetch, from the vertex cache or the off-chip memory, pieces of attribute information having same indexes as the remaining indexes, using the updated index list in operation 845.

In operation 850, the vertex processing apparatus may shade the fetched attribute information. Operations 845 and 850 may be repeatedly performed until shading of pieces of attribute information having same indexes as the pieces of target position information are completed.

When operations 845 and 850 are being performed, the vertex processing apparatus may map the pieces of target position information to the viewport in operation 855, and may perform tile binning on the mapped pieces of target position information in operation 860.

In operation 865, the vertex processing apparatus may combine a result of the tile binning with the shaded pieces of attribute information, and may output a result of the combining.

Operations 840 through 865 may be repeatedly performed using a bunch of a plurality of primitives for efficiency.

In operation 870, the vertex processing apparatus may determine whether operations 850 and 860 are completed. In operation 875, the vertex processing apparatus may update the off-chip memory with the combined information obtained in operation 865, when operations 850 and 860 are determined to be completed.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on a computer-readable media, e.g., a non-transitory or persistent computer-readable medium. Examples of the non-transitory or persistent computer-readable media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

The vertex processing method may be executed on a general purpose computer or processor or may be executed on a particular machine such as the vertex processing apparatus described herein. Any one or more of the software modules described herein may be executed by a dedicated processor unique to that unit or by a processor common to one or more of the modules.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A vertex processing method of a graphics pipeline for tile-based rendering (TBR), the vertex processing method comprising:
   fetching, by a processor, pieces of position information of vertexes;
   outputting pieces of target position information pertaining to primitives displayed on a viewport among the fetched pieces of position information;
   performing tile binning on the output pieces of target position information, and outputting a result of the tile binning;
   fetching pieces of attribute information of vertexes corresponding to the pieces of target position information among the vertexes, and shading the fetched pieces of attribute information; and
   simultaneously storing the result of the tile binning and the shaded pieces of attribute information,
   wherein the performing of the tile binning on the pieces of target position information is performed in parallel with the fetching or the shading of the pieces of attribute information when the pieces of attribute information correspond to the pieces of target position information.

2. The vertex processing method of claim 1,
   wherein the simultaneously storing of the result of the tile binning and the shaded pieces of attribute information is in an off-chip memory connected via a bus to a processor, the processor processing an operation of the graphics pipeline.

3. The vertex processing method of claim 1, wherein the fetching of the pieces of position information comprises:
   storing indexes of the vertexes in a vertex index buffer;
   caching the pieces of position information and the pieces of attribute information in a vertex cache; and
   fetching, from the vertex cache, pieces of position information corresponding to the indexes inputted from the vertex index buffer.

4. The vertex processing method of claim 1, wherein the pieces of attribute information comprise normal vector information of the vertexes, color information of the vertexes, and texture coordinate information of the vertexes.

5. The vertex processing method of claim 1, wherein the pieces of target position information are obtained by excluding pieces of non-target position information pertaining to a primitive not displayed on a screen, from the fetched pieces of position information.

6. The vertex processing method of claim 5, wherein the outputting of the pieces of target position information comprises removing the pieces of non-target position information using at least one of a back face culling process, a trivial accept and reject test process used to remove a vertex outside the viewport, and a zero-area triangle removal process used to remove a vertex displayed as a point having a size less than a pixel size.

7. The vertex processing method of claim 1, further comprising:
   shading the fetched pieces of position information and performing a transformation on a position; and
   mapping the output pieces of target position information to the viewport.

8. A non-transitory computer-readable medium storing a program to control a computer to execute the method of claim 1.

9. The vertex processing method of claim 1, further comprising:
   adding the result of the tile binning to the shaded pieces of attribute information,
   wherein the adding is only performed when the result of tile binning and the shaded pieces of attribute information exist.

10. A vertex processing apparatus for tile-based rendering (TBR), the vertex processing apparatus comprising:
    at least one computer comprising:
    a fetching unit to fetch pieces of position information of vertexes and to selectively fetch pieces of attribute information of the vertexes based on whether indexes remain in an index list;
    a first shader to transform the pieces of position information fetched by the fetching unit to a coordinate system on a viewport;
    a primitive assembly unit to output pieces of target position information pertaining to primitives displayed on the viewport, among the pieces of position information fetched by the fetching unit;
    a tile binning unit to perform tile binning on the output pieces of the target position information, and to output a result of the tile binning;
    a second shader to shade pieces of attribute information of vertexes corresponding to the pieces of target position information among the vertexes, when the pieces of attribute information are fetched by the fetching unit, and
    memory to simultaneously store the result of the tile binning the shaded pieces of attribute information,
    wherein the tile binning unit performs tile binning on the pieces of target position information in parallel with the fetching unit fetching or the second shading unit shading the pieces of attribute information when the pieces of attribute information correspond to the pieces of target position information.

11. The vertex processing apparatus of claim 10, wherein the result of the tile binning and the shaded pieces of attribute information are simultaneously stored in an off-chip memory connected via a bus to the vertex processing apparatus.

12. The vertex processing apparatus of claim 10, wherein the fetching unit comprises:
    a vertex index buffer to store indexes of the vertexes;
    a vertex cache to cache the pieces of position information and the pieces of attribute information; and
    a vertex data fetching unit to fetch, from the vertex cache, pieces of position information corresponding to the indexes inputted from the vertex index buffer, and to fetch, from the vertex cache, pieces of attribute information corresponding to a same index as the pieces of target position information.

13. The vertex processing apparatus of claim 10, wherein the pieces of attribute information comprise normal vector information of the vertexes, color information of the vertexes, and texture coordinate information of the vertexes.

14. The vertex processing apparatus of claim 10, wherein the primitive assembly unit outputs, as the pieces of target position information, pieces of position information obtained by excluding pieces of non-target position information pertaining to a primitive not displayed on a screen, from the fetched pieces of position information.

15. The vertex processing apparatus of claim 14, wherein the primitive assembly unit removes the pieces of non-target position information using at least one of a back face culling process, a trivial accept and reject test process used to remove a vertex outside the viewport, and a zero-area triangle removal process used to remove a vertex displayed as a point having a size less than a pixel size.

16. The vertex processing apparatus of claim 10, further comprising:
a viewport mapping unit to map the output pieces of target position information to the viewport.

17. The vertex processing apparatus of claim 10, further comprising:
a multiplexer to provide the first shader with the pieces of position information and to provide the second shader with the pieces of attribute information, the pieces of position information and the pieces of attribute information being selectively fetched by the fetching unit.

18. The vertex processing apparatus of claim 10, further comprising:
an adding unit to add the result of tile binning to the shaded pieces of attribute information from the second shader; and
a switching unit to provide a data transmission path between the second shader and the adding unit,
wherein the data transmission path is only provided when the shaded pieces of attribute information from the second shader exist.

19. A vertex processing method of a graphics pipeline for tile-based rendering (TBR), the vertex processing method comprising:
configuring one or more computers to execute:
outputting pieces of target position information corresponding to primitives displayed on a viewport among fetched pieces of position information;
tile binning the output pieces of target position information, and outputting a result of the tile binning;
shading the fetched pieces of attribute information of vertexes corresponding to the pieces of target position information among the vertexes; and
simultaneously storing the result of the tile binning and the shaded pieces of attribute information,
wherein the performing of the tile binning on the pieces of target position information is performed in parallel with the fetching and the shading of the pieces of attribute information when the pieces of attribute information correspond to the pieces of target position information.

20. A vertex processing method of a graphics pipeline for tile-based rendering (TBR), the vertex processing method comprising:
fetching, by a processor, pieces of position information of vertexes;
shading the fetched pieces of position information and performing a transformation on a position;
mapping the output pieces of target position information to a viewport.
outputting pieces of target position information pertaining to primitives displayed on the viewport among the fetched pieces of position information;
fetching pieces of attribute information of vertexes corresponding to the pieces of target position information among the vertexes, and shading the fetched pieces of attribute information;
performing tile binning on the output pieces of target position information in parallel with the fetching or the shading of the pieces of attribute information when the pieces of attribute information correspond to the pieces of target position information, and outputting a result of the tile binning; and
simultaneously storing the result of the tile binning and the shaded pieces of attribute information.

* * * * *

UNITED STATES PATENT AND TRADEMARK OFFICE
CERTIFICATE OF CORRECTION

PATENT NO. : 8,810,585 B2  
APPLICATION NO. : 13/182716  
DATED : August 19, 2014  
INVENTOR(S) : Kyoung June Min et al.

Page 1 of 1

It is certified that error appears in the above-identified patent and that said Letters Patent is hereby corrected as shown below:

In the Claims

Column 14, Line 25, in Claim 20, delete "viewport." and insert -- viewport; --, therefor.

Signed and Sealed this  
Fifth Day of May, 2015

Michelle K. Lee  
*Director of the United States Patent and Trademark Office*